March 10, 1925.
J. TALBERT
FENDER BRACE
Filed March 12, 1924
1,529,514
Fig.1.
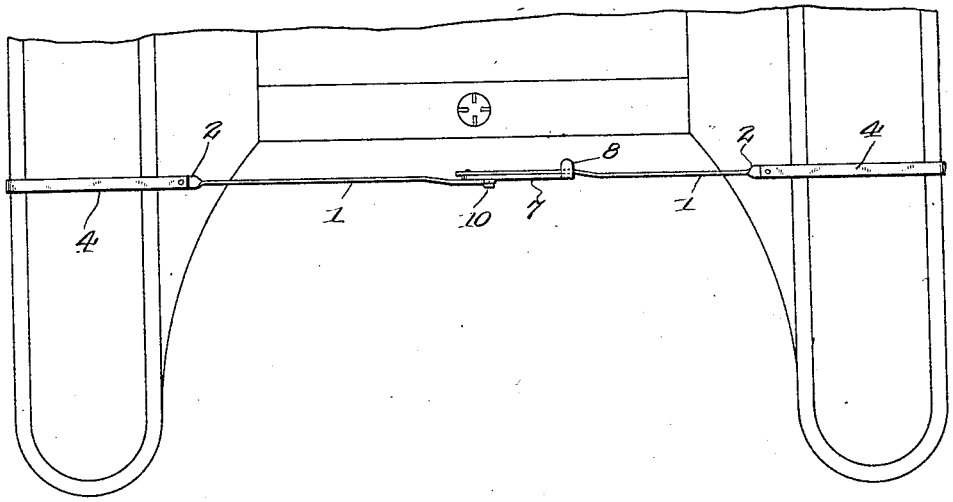
Fig.2.
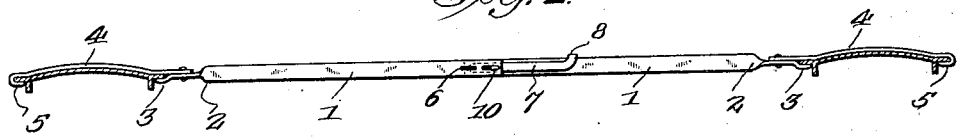
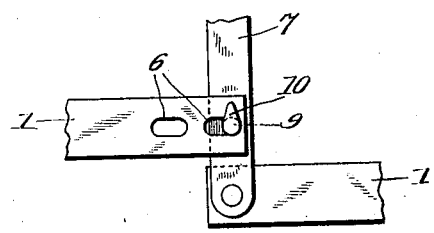
Fig.3.
Inventor
Jesse Talbert
By
Attorney Patented Mar. 10, 1925.

1,529,514

UNITED STATES PATENT OFFICE.

JESSE TALBERT, OF WAGONER, OKLAHOMA.

FENDER BRACE.

Application filed March 12, 1924. Serial No. 698,655.

*To all whom it may concern:*

Be it known that I, JESSE TALBERT, a citizen of the United States, residing at Wagoner, in the county of Wagoner and State of Oklahoma, have invented certain new and useful Improvements in Fender Braces, of which the following is a specification.

This invention relates to fender braces and it consists in the novel features hereinafter described and claimed.

An object of the invention is to provide a fender brace of simple and durable structure adapted to be readily applied to the fenders at the opposite sides of an automobile machine and which will effectually hold the fenders against vibration as the machine is passing over a roadway.

The parts of the brace are so assembled and arranged with relation to each other that the brace structure may be detached from the fenders when desired. The parts are foldable and when the brace is detached it may be carried in the body of the machine in folded and compact form and thus occupying but little space in the machine when not in use.

With these objects in view the brace comprises a pair of rod sections each of which is provided at its outer end with a twisted portion which terminates in a lip. The lips are adapted to fit under the inner edges of the fenders. Clips are pivotally mounted upon the twisted end portions of the sections and are provided at their outer ends with under turned lips adapted to fit under the outer edges of the fenders. Lever operated means are provided at the inner overlapping ends of the sections whereby the said sections may be drawn toward each other and locked whereby the lips are drawn under the outer edges of the fenders and the inner edges of the fenders are forced over and in close contact with the lips at the outer ends of the sections. Therefore the brace effectually holds the fenders against vibration when applied and the brace may fit up close against the guard of the radiator of the automobile machine and hence is out of the way and will not interfere with the front lights or the relative movement thereof.

In the accompanying drawing—

Figure 1 is a top plan view of the fender brace applied.

Figure 2 is a front elevation of the same.

Figure 3 is a front elevation of the brace showing the relative positions of the parts thereof when the fender is about to be applied or to be removed.

The other figures are detailed views of the features of the invention.

The brace comprises rod or bar sections 1 each of which is provided at its outer end with a twisted portion 2 having a lip 3 adapted to fit under and against the inner edge of one of the fenders of an automobile machine. Clips 4 are pivotally mounted upon the twisted portions 2 of the sections and are adapted to lie transversely of the fenders and the clips are provided at their outer ends with lips 5 which are adapted to engage under and against the outer edges of the fenders.

One of the sections 1 is provided at its inner end portion with elongated openings 6 which are spaced from each other and disposed in a row longitudinally of the said section. A lever 7 is fulcrumed upon the inner end portion of the other section 1 and is provided at its free end with a lug portion 8 which is adapted to engage over the edge of the same section when the parts are in locked position upon the fenders. The lever carries at one side an outwardly disposed stud 9 having an elongated head 10 eccentrically disposed upon the shank portion of the stud. The said head may be inserted through one of the openings 6 and when the lever is swung or turned the head of the stud is disposed transversely of the said opening and bridges the same whereby the parts are prevented from moving laterally with relation to each other. The stud is located to one side of the fulcrum point of the lever and hence when the stud is inserted in one of the openings and the lever is swung the rod sections are drawn toward each other and their inner end portions are overlapped whereby the lips upon the clips are drawn tightly under the outer edges of the fenders and the inner edge portions of the fenders are forced firmly upon and in close contact with the lips provided at the outer ends of the rod sections.

Therefore it will be seen that a fender brace of simple and durable structure is provided and that the parts thereof may be easily and quickly manipulated to place the brace in position upon the fenders and to remove the same when required or desired.

Having described the invention what is claimed is—

A fender brace comprising rod sections having offset end portions, the offset end portion of one section having elongated openings, a lever fulcrumed upon the offset end portion of the other section and provided at its outer side and at a point between its ends with an outstanding stud adapted to engage in the openings of the first mentioned rod section, the said rod sections being provided at their outer ends with twisted portions disposed in planes at a right angle to the planes in which the intermediate portions of the said rod sections lie, clips applied to the side surface of said twisted portions whereby the clips and the rod sections overlap each other, the parts being so arranged that when the brace is applied, the inner offset end portions of the rod sections overlap each other at right angles to the overlapping portions of the clips and rod sections and the lever lies between the offset overlapping end portions of the rod sections.

In testimony whereof I affix my signature.

JESSE TALBERT.